United States Patent [19]

Nakamura et al.

[11] Patent Number: 4,720,078

[45] Date of Patent: Jan. 19, 1988

[54] SOLENOID VALVE

[75] Inventors: Mamoru Nakamura, Takahama; Hideo Haneda, Toyota; Shigelu Nishio, Kariya; Takao Nonoyama, Toyota, all of Japan

[73] Assignees: Aisen Seiki Kabushiki Kaisha; Toyota Jidosha Kabushiki Kaisha, both of Japan

[21] Appl. No.: 803,738

[22] Filed: Dec. 2, 1985

[30] Foreign Application Priority Data

Dec. 1, 1984 [JP] Japan .................. 59-254542

[51] Int. Cl.⁴ .............. F16K 31/06; H01F 5/04
[52] U.S. Cl. ................ 251/129.15; 251/129.01; 251/129.21; 335/292; 335/299
[58] Field of Search ............... 251/129.21, 129.15; 335/292, 299

[56] References Cited

U.S. PATENT DOCUMENTS 4,299,374 11/1981 Yamanaka ............... 251/129.21
4,326,696 4/1982 Ishikawa et al. .
4,523,739 6/1985 Johansen et al. ........... 251/129.21
4,540,891 9/1985 Keener et al. ............. 200/84 R

FOREIGN PATENT DOCUMENTS 2161617 10/1972 Fed. Rep. of Germany ............ 251/129.15
0081283 5/1983 Japan ................ 251/129.21

*Primary Examiner*—Arnold Rosenthal
*Attorney, Agent, or Firm*—Finnegan, Henderson, Farabow, Garrett & Dunner

[57] ABSTRACT

A solenoid valve includes a non-magnetic bobbin accommodating stationary and movable cores in a central bore, a coil wound on the bobbin, a magnetic yoke arranged on the outer portion of the coil and secured to the bobbin, a fluid passageway opened and closed by the movable core, a cover surrounding the outer portion of the coil, and a control circuit module for controlling the solenoid valve. The control circuit module is imbedded in the cover to form an integral part thereof and is electrically connected to terminals securely implanted in the bobbin or cover.

5 Claims, 4 Drawing Figures

SOLENOID VALVE

BACKGROUND OF THE INVENTION

1. Field of the Invention

This invention relates to a solenoid valve used for example in controlling intake in an automotive vehicle. More particularly, the invention relates to control for opening and closing a solenoid valve in dependence upon such parameters as engine temperature and engine speed.

2. Description of the Prior Art

A solenoid valve of the type to which the present invention appertains is opened and closed to regulate, say, the intake of an automotive vehicle. To effect such control in response to such parameters as engine temperature and speed, a control circuit module is employed for investigating signals dependent upon these parameters and for controlling the flow of current to an electromagnetic coil in the solenoid valve based upon the status of these signals. The control circuit module is accommodated in a space provided for it inside the engine room, though the location at which the control circuit module is disposed is sometimes a considerable distance from the location of the solenoid valve. This makes it difficult to install the control circuit module in the limited confines of the engine room.

SUMMARY OF THE INVENTION

Accordingly, an object of the present invention is to provide a solenoid valve in which the control circuit module is incorporated in the cover of the valve to solve the aforementioned problem encountered in the prior art.

According to the present invention, the foregoing object is attained by providng a solenoid valve in which the control circuit module is imbedded within the cover of the solenoid valve to form an integral component of the valve, with the module being electrically connected to terminals securely implanted inside the bobbin or cover.

To use the solenoid valve, electrical power and signals from sensors for sensing such parameters as engine temperature and speed are fed into the connector of the solenoid valve. Separate wiring for the control circuit module is therefore unnecessary, thus facilitating handling.

Other features and advantages of the present invention will be apparent from the following description taken in conjunction with the accompanying drawings, in which like reference characters designate the same or similar parts throughout the figures thereof.

FURTHER DESCRIPTION OF THE PRIOR ART

Figure 1:
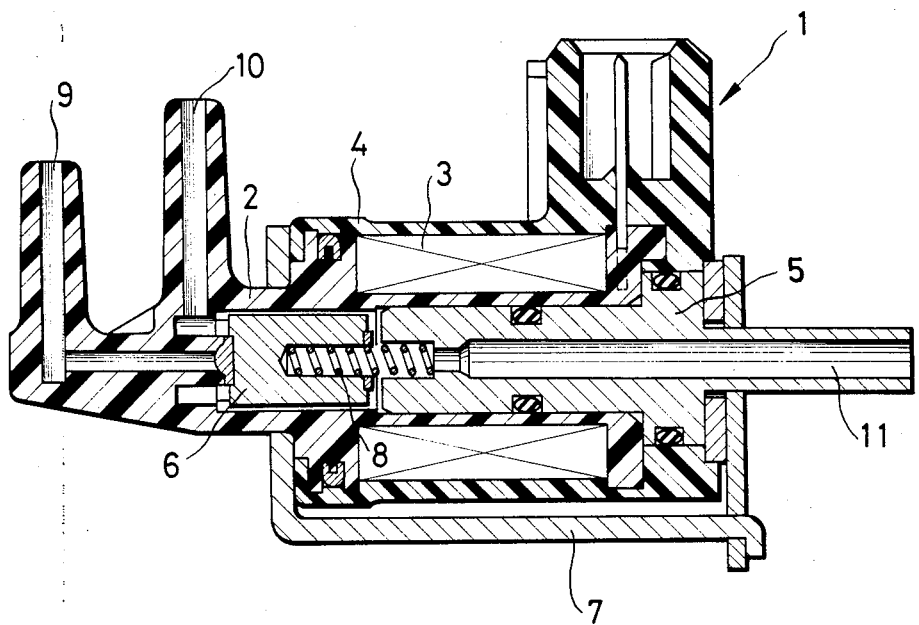
FIG. 1 is a sectional view illustrating a solenoid valve according to the prior art.

Before describing an embodiment of the present invention in detail, let us refer to FIG. 1 for a more detailed review of the art to which the present invention appertains.

A conventional solenoid valve as illustrated in FIG. 1 includes a non-magnetic bobbin 2 made of a synthetic resin, an electromagnetic coil 3 wound upon the bobbin 2, a synthetic resin cover 4 secured to the bobbin 2, as well as a stationary core 5 and movable core 6 arranged in a central bore formed in the bobbin 2. A magnetic yoke 7 made of iron is provided on the outer side of the cover 4 in order to form a magnetic circuit which includes the two cores 5, 6. When a current is passed through the coil 3, a magnetic flux is generated in the magnetic circuit comprising the stationary core 5, movable core 4 and yoke 7, thereby producing an attractive force between the stationary core 5 and movable core 6 that attracts the movable core 6 toward the stationary core 5 against the force of a spring 8. As a result, an inlet port 9 communicating with an intake manifold is connected to an outlet port 10 communicating with a valve actuated by negative pressure, and the outlet port 10 is cut off from a passage 11 open to the atmosphere.

To control the opening and closing of such a solenoid valve in dependence upon such parameters as engine temperature and speed, use is made of a control circuit module for controlling the flow of electric current to the electromagnetic coil of the solenoid valve upon rendering a decision regarding the status of electric signals indicative of the engine speed, engine temperature and other parameters. Though the control circuit module is accommodated in an appropriate space inside the engine room, there are occasions where the location at which the control circuit module is installed is quite far from the location of the valve. This makes it difficult to dispose the control circuit module in the limited confines of the engine room.

DESCRIPTION OF THE PREFERRED EMBODIMENT

Figure 2:
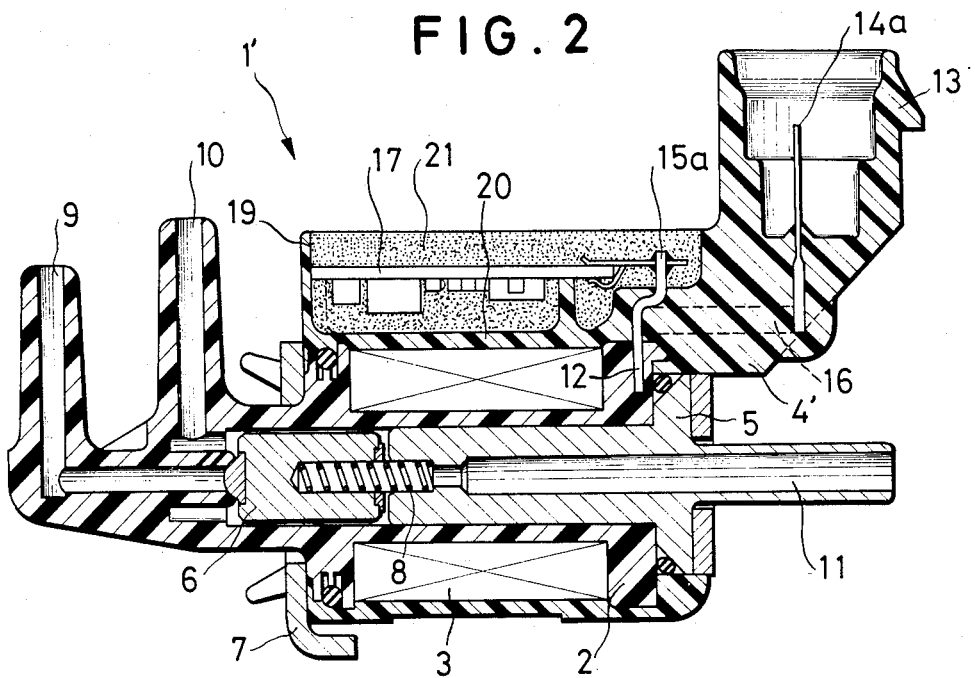
FIG. 2 is a sectional view illustrating a preferred embodiment of a solenoid valve according to the present invention.
Figure 3:
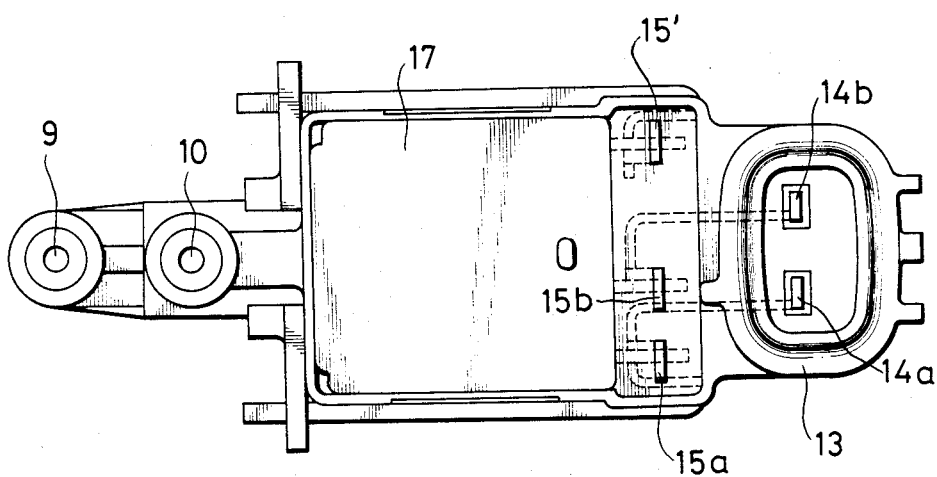
FIG. 3 is a plan view of the solenoid valve shown in FIG. 2.

The present invention is directed to solving the foregoing problem and will now be described in detail with reference to FIGS. 2 through 4, in which portions similar to those shown in FIG. 1 are designated by like reference characters and need not be described again.

Figure 4:
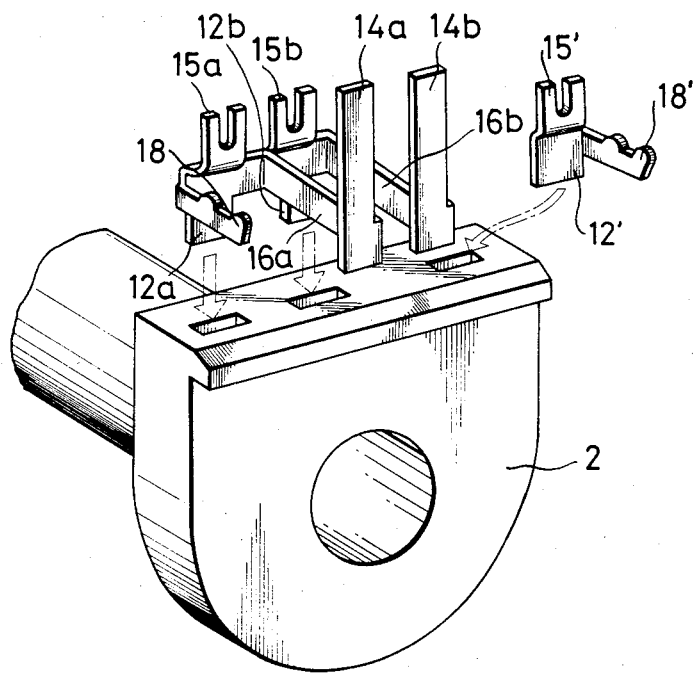
FIG. 4 is a perspective view of terminals employed in the solenoid valve of the present invention.

As best seen in FIG. 4, a solenoid valve 1' according to the present invention includes a pair of terminals 14a, 14b constituted by plate connectors for positive and negative polarity, respectively, a pair of terminals 15a, 15b serving as the terminals of a control circuit module 17 for controlling the solenoid valve 1', a plate 16a interconnecting the terminals 14a, 15a, and a plate 16b interconnecting the terminals 14b, 15b. One end of the terminal 15a is integrally provided with a tab 18 for the coil 3. The lower end portions of the terminals 15a, 15b are formed to include respective pieces 12a, 12b for being imbedded in the bobbin 2. Another terminal 15' is provided for receiving a signal from the control circuit module 17. The terminal 15' includes a tab 18' connected to the other end of the coil 3, and a piece 12' for being imbedded in the bobbin 2.

The terminal pieces 12a, 12b, 12' are imbedded in the bobbin 2 and integrated therewith when the bobbin 2 is molded from a non-magnetic synthetic resin. The coil 3 is then wound upon the bobbin 2 and both ends of the coil are soldered to the tabs 18, 18'. When the cover, here shown at numeral 4', is molded around the bobbin 2, the terminals are insert-molded in the cover 4' in such a manner that the terminals 14a, 14b partially project from the hollow portion of a socket 13 and the terminals 15a, 15b, 15' partially project from the outer surface of the cover 4'.

The cover 4' is formed to include a guide wall 19 at the side of the socket 13, and a flat face 20 surrounded by the guide wall 19. The control circuit module 17 has its terminals soldered to the terminals 15a, 15b, 15' and is placed on the flat face 20 of the cover 4'. An epoxy resin 21 is introduced to envelop the control circuit module 17 and fill the gap between the module and the cover 4', thereby fixing the control circuit module 17 to the cover 4'.

Though the terminals 14a, 15a are molded integrally with the terminals 14b, 15b through the intermediary of an insulator in advance, it goes without saying that these terminals can be molded individually.

Since the control circuit module is soldered to the terminals on the cover, harnesses and connectors are unnecessary. This eliminates the risk of poor connector contact and breakage of harness wires. In addition, since there is no harness weaving through the equipment, the solenoid valve is not readily susceptible to noise from other electrical units. This assures that control can be precisely performed. Furthermore, since the control circuit module is installed directly in the cover of the solenoid valve and encapsulated in the epoxy resin, a separate casing for the module is unnecessary.

As many apparently widely different embodiments of the present invention can be made without departing from the spirit and scope thereof, it is to be understood that the invention is not limited to the specific embodiments thereof except as defined in the appended claims.

What is claimed is:

1. A solenoid valve comprising:
   a bobbin of non-magnetic synthetic resin having a central bore;
   fluid passageway means communicating with said central bore;
   a coil wound upon said bobbin for generating a magnetic field when activated and having an outer peripheral portion;
   a stationary core disposed in said central bore of said bobbin;
   a movable core situated in said central bore of said bobbin and spaced away from said stationary core via a spring, said movable core moving in response to the magnetic field generated by said coil to open or close said fluid passageway means;
   a magnetic yoke arranged on an outer peripheral portion of said coil and secured to said bobbin;
   a cover surrounding said outer peripheral portion of said coil, said cover including a socket;
   a control circuit module for selectively activating said coil, said control circuit module being integrally imbedded in said cover; and
   first, second, and third terminals each having a portion securely imbedded in said cover and electrically connected to said control circuit module, each of said first and third terminals being further connected to said coil and each of said first and second terminals having connector means for connecting to one polarity of a power supply, said connector means of said first and second terminals respectively including first and second connecting electrodes positioned in said socket.

2. The solenoid valve according to claim 1, wherein said cover includes means for accommodating said control circuit module, said accommodating means being filled with an epoxy resin for integrally imbedding said control circuit module in said cover.

3. The solenoid valve according to claim 1, wherein each of said first, second, and third terminals includes a securing portion imbedded in said bobbin.

4. The solenoid valve according to claim 1, wherein each of said first and second terminals includes a solder portion electrically connected to said control circuit module, and a plate connecting said solder portion to said respective connecting electrode, said plates of said first and second terminals being imbedded in said cover.

5. A solenoid valve oomprising:
   a bobbin of non-magnetic synthetic resin having a central bore;
   fluid passageway means communicating with said central bore;
   a coil wound upon said bobbin for generating a magnetic field when activated and having an outer peripheral portion;
   a stationary core disposed in said central bore of said bobbin;
   a movable core situated in said central bore of said bobbin and spaced away from said stationary core via a spring, said movable core moving in response to the magnetic field generated by said coil to open or close said fluid passageway means;
   a magnetic yoke arranged on an outer peripheral portion of said coil and secured to said bobbin;
   a cover surrounding said outer peripheral portion of said coil, said cover including a flat face surrounded by a guide wall, said flat face and said guide wall defining a mounting cavity;
   a control circuit module for selectively activating said coil, said control circuit module being positioned within said mounting cavity spaced from said flat face and being fixed to said cover by an epoxy resin filling said mounting cavity and the space between said control circuit module and said flat face; and
   first, second, and third terminals each having a portion securely imbedded in said cover and electrically connected to said control circuit module, each of said first and third terminals being further connected to said coil and each of said first and second terminals having connector means for connecting to one polarity of a power supply.

* * * * *

UNITED STATES PATENT AND TRADEMARK OFFICE
CERTIFICATE OF CORRECTION

PATENT NO. : 4,720,078
DATED : January 19, 1988
INVENTOR(S) : Mamoru Nakamura, Hideo Haneda, and Shigelu Nishio It is certified that error appears in the above-identified patent and that said Letters Patent is hereby corrected as shown below:

Item [73] on title page of patent

Please change "Aisen" to --Aisin--.

Signed and Sealed this

Twenty-ninth Day of November, 1988

*Attest:*

DONALD J. QUIGG

*Attesting Officer*      *Commissioner of Patents and Trademarks*